(12) United States Patent
Kazi et al.

(10) Patent No.: US 11,341,063 B2
(45) Date of Patent: May 24, 2022

(54) SYSTEMS AND METHODS FOR SAFELY DETECTING INDETERMINATE STATES OF RANGES IN A SELF-ENCRYPTING STORAGE RESOURCE

(71) Applicant: Dell Products L.P., Round Rock, TX (US)

(72) Inventors: Jaleel A. Kazi, Westford, MA (US); Michael Garvey, Brimfield, MA (US); Kevin T. Marks, Georgetown, TX (US); Dale R. Elliott, Northborough, MA (US)

(73) Assignee: Dell Products L.P., Round Rock, TX (US)

( * ) Notice: Subject to any disclaimer, the term of this patent is extended or adjusted under 35 U.S.C. 154(b) by 759 days.

(21) Appl. No.: 16/263,361

(22) Filed: Jan. 31, 2019

(65) Prior Publication Data
US 2020/0250107 A1    Aug. 6, 2020

(51) Int. Cl.
| | |
|---|---|
| *G06F 12/0873* | (2016.01) |
| *G06F 12/0868* | (2016.01) |
| *G06F 12/14* | (2006.01) |
| *G06F 13/12* | (2006.01) |
| *G06F 21/78* | (2013.01) |
| *G06F 12/126* | (2016.01) |
| *G06F 3/06* | (2006.01) |

(Continued)

(52) U.S. Cl.
CPC ........ *G06F 12/1408* (2013.01); *G06F 3/0659* (2013.01); *G06F 12/126* (2013.01); *G06F 13/126* (2013.01); *G06F 21/78* (2013.01); *G06F 2212/402* (2013.01)

(58) Field of Classification Search
None
See application file for complete search history.

(56) References Cited

U.S. PATENT DOCUMENTS

| | | | | |
|---|---|---|---|---|
| 5,390,186 A | * | 2/1995 | Murata | ............... G06F 12/0804 |
| | | | | 711/E12.04 |
| 6,513,074 B1 | * | 1/2003 | Dimitri | ................. G06F 3/0613 |
| | | | | 712/225 |

(Continued)

OTHER PUBLICATIONS

Non-Preemptive Demand Paging Technique for NAND Flash-based Real-Time Embedded Systems. Kim. IEEE. (Year: 2010).*

(Continued)

*Primary Examiner* — Venkat Perungavoor
(74) *Attorney, Agent, or Firm* — Jackson Walker L.L.P.

(57) ABSTRACT

An information handling system may include a host system processor and a storage resource communicatively coupled to the host system processor. The storage resource may be configured to, responsive to receiving a command from the host system processor relating an address range of the storage resource, create an entry in a drive status table stored in a persistent storage area of the storage resource, the entry setting forth information indicative of the address and a completion status of the command and update a status of the address range in the drive status table as steps of the command are completed by the storage resource, such that, if a drive event occurs preventing full completion of the command, the host system processor may access the drive status table to determine a status of the command, and take a remedial action based on the status of the command.

9 Claims, 2 Drawing Sheets

(51) Int. Cl.
*G06F 12/1009* (2016.01)
*G06F 12/1081* (2016.01)

(56) References Cited

U.S. PATENT DOCUMENTS

| | | | |
|---|---|---|---|
| 10,884,658 B2* | 1/2021 | Benisty | G06F 12/00 |
| 11,099,776 B2* | 8/2021 | You | G06F 3/0659 |
| 2006/0143506 A1* | 6/2006 | Whitt | G06F 3/061 |
| | | | 714/6.12 |
| 2009/0031083 A1* | 1/2009 | Willis | G06F 11/2092 |
| | | | 711/135 |
| 2010/0070656 A1* | 3/2010 | Snell | G06F 3/0689 |
| | | | 710/5 |
| 2011/0296098 A1* | 12/2011 | Sauber | G11C 11/40611 |
| | | | 711/106 |
| 2011/0296133 A1* | 12/2011 | Flynn | G06F 3/0619 |
| | | | 711/171 |
| 2013/0046942 A1* | 2/2013 | Namba | G06F 3/0688 |
| | | | 711/156 |
| 2013/0067144 A1* | 3/2013 | Namba | G06F 3/0688 |
| | | | 711/103 |
| 2013/0166783 A1* | 6/2013 | Kim | G06F 3/0614 |
| | | | 710/6 |
| 2013/0191565 A1* | 7/2013 | Tal | G06F 3/0659 |
| | | | 710/74 |
| 2014/0089562 A1* | 3/2014 | Deguchi | G06F 3/061 |
| | | | 711/103 |
| 2014/0281171 A1* | 9/2014 | Canepa | G06F 3/0688 |
| | | | 711/103 |
| 2015/0019830 A1* | 1/2015 | Park | G06F 3/0674 |
| | | | 711/165 |
| 2015/0127922 A1* | 5/2015 | Camp | G06F 3/0659 |
| | | | 711/206 |
| 2015/0324145 A1* | 11/2015 | Akutsu | G06F 3/0631 |
| | | | 711/114 |
| 2015/0363338 A1* | 12/2015 | Cho | G06F 3/061 |
| | | | 711/154 |
| 2017/0123656 A1* | 5/2017 | Benisty | G06F 3/0688 |
| 2017/0228162 A1* | 8/2017 | Tan | G06F 3/0679 |
| 2017/0315754 A1* | 11/2017 | Craddock | G06F 3/0613 |
| 2017/0371785 A1* | 12/2017 | Boyd | G06F 12/0804 |
| 2018/0004454 A1* | 1/2018 | Sampathkumar | G06F 3/0659 |
| 2018/0074702 A1* | 3/2018 | Chen | G06F 3/0653 |
| 2018/0341690 A1* | 11/2018 | Osada | G06F 12/0804 |
| 2019/0324690 A1* | 10/2019 | Jin | G06F 12/0292 |
| 2021/0165682 A1* | 6/2021 | Xiao | G06F 13/4282 |

OTHER PUBLICATIONS

AHCI and NVMe as interfaces for SATA Express™ Devices. Landsman. (Year: 2013).*
Preemptible I/O Scheduling of Garbage Collection for Solid State Drives. Lee. IEEE. (Year: 2013).*
Design and Implementation of Data Storage System Using USB Flash Drive in a Microcontroller Based Data Logger. Mahendra. IEEE. (Year: 2015).*
Design and Implementation of a Mobile Storage Leveraging the DRAM Interface. Seo. IEEE. (Year: 2016).*
Log-Buffer Aware Cache Replacement Policy for Flash Storage Devices. Anwar. IEEE. (Year: 2017).*
Scalable parallel computing on clouds using Twister4Azure iterative MapReduce. Gunarathne. Elsevier. (Year: 2013).*
Optimization of probabilistic & decentralized Load Balancer on SSI cluster. Mohsin. IEEE. (Year: 2009).*
Trustzone Explained: Architectural Features and Use Cases. Ngabonziza. IEEE. (Year: 2016).*
DMA Cache: Using On-Chip Storage to Architecturally Separate I/O Data from CPU Data for Improving I/O Performance. Tang. IEEE. (Year: 2009).*
Synchronous Design of 8259 Programmable Interrupt Controller. Yap. IEEE. (Year: 2011).*

* cited by examiner

SYSTEMS AND METHODS FOR SAFELY DETECTING INDETERMINATE STATES OF RANGES IN A SELF-ENCRYPTING STORAGE RESOURCE

TECHNICAL FIELD

The present disclosure relates in general to information handling systems, and more particularly to methods and systems for safely detecting indeterminate states of ranges in a self-encrypting storage resource.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is well known that storage resources such as hard disk drives, solid state storage drives, and other storage media are used to store digital data for later access by an information handling system. In many instances, data stored on storage resources is critical proprietary data for which the owner or creator of such data may desire to secure the data in such a manner to prevent unauthorized access to the data. One of the ways in which data security is provided is through the use of self-encrypting drives, in which a physical storage resource itself includes hardware for encrypting and decrypting data stored thereon.

Users of self-encrypting drives may desire the ability to reconfigure self-encrypting drives in a secure storage environment. Prior to being able to provide data security, self-encrypting drives must be configured with security policies, including encryption keys, passphrases, and applicable data ranges associated with such encryption keys. To perform such configuration, a host system may communicate appropriate commands (e.g., commands in accordance with the Trusted Computing Group (TCG) standard) to the self-encrypting drive. Examples of such commands include those which may create, delete, or revert a range of secure data.

Each range (e.g., secured logical block address (LBA) range) within a self-encrypting drive has a data-encryption key (DEK) which is internally generated and maintained by the self-encrypting drive, and which is used to encrypt and decrypt the data that is written by a host system to the range or read from the range by the host system. It is generally expected that a DEK is regenerated and loaded in the internal policy engine of the self-encrypting drive before the user-provided security command (e.g., invoking a create, delete, or revert operation) is considered successfully completed.

Normally, the time required for these above-mentioned operations on a range of the self-encrypting drive is in the magnitude of milliseconds. In certain environments, there are additional sub-steps that are required apart from the TCG-described command before the configuration can be considered as successfully completed. These additional steps may increase the time required for configuration to the magnitude of several seconds to minutes depending on the storage capacity of the self-encrypting drive and the self-encrypting drive cannot guarantee an atomicity of these multi-step commands due to the fact that a drive event may occur, such as a drive power loss or drive reset. Such a drive event may cause a self-encrypting drive to not complete its previous command operation and break the atomicity of an operation, as it is unable to revert the changes. Because user commands are generally session-based, events like power loss and a controller reset may cause loss of session state, and a session may not be persistent across such events. A partial completion of a multi-step operation may lead to the drive range getting into an indeterminate state.

To illustrate, a drive event occurring while a self-encrypting drive is processing a time-consuming, multi-step command may lead to an abort of the main command. When the main command is abruptly aborted without a status response, it may not be possible to verify the integrity of the data in an address range or the range itself, and command processing may have no rollback mechanism for individual steps of the multi-step command. Using existing approaches, there are no mechanisms to relay back the status of sub-steps within a main command to the host system. Also, with existing approaches, a host system may have no visibility as to the state of the sub-step operation carried out before a drive event occurred.

SUMMARY

In accordance with the teachings of the present disclosure, the disadvantages and problems associated with the existence of indeterminate states of ranges in a self-encrypting storage resource may be reduced or eliminated.

In accordance with embodiments of the present disclosure, an information handling system may include a host system processor and a storage resource communicatively coupled to the host system processor. The storage resource may be configured to, responsive to receiving a command from the host system processor relating an address range of the storage resource, create an entry in a drive status table stored in a persistent storage area of the storage resource, the entry setting forth information indicative of the address and a completion status of the command and update a status of the address range in the drive status table as steps of the command are completed by the storage resource, such that, if a drive event occurs preventing full completion of the command, the host system processor may access the drive status table to determine a status of the command, and take a remedial action based on the status of the command.

In accordance with these and other embodiments of the present disclosure, a method may be provided for use on a storage resource communicatively coupled to a host system processor of an information handling system. The method may include, responsive to receiving a command from the host system processor relating an address range of the storage resource, creating an entry in a drive status table stored in a persistent storage area of the storage resource, the entry setting forth information indicative of the address and a completion status of the command and updating a status of the address range in the drive status table as steps of the command are completed by the storage resource, such that, if a drive event occurs preventing full completion of the command, the host system processor may access the drive status table to determine a status of the command, and take a remedial action based on the status of the command.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, on a storage resource communicatively coupled to a host system processor of an information handling system: responsive to receiving a command from the host system processor relating an address range of the storage resource, create an entry in a drive status table stored in a persistent storage area of the storage resource, the entry setting forth information indicative of the address and a completion status of the command; and update a status of the address range in the drive status table as steps of the command are completed by the storage resource; such that, if a drive event occurs preventing full completion of the command, the host system processor may access the drive status table to determine a status of the command, and take a remedial action based on the status of the command.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
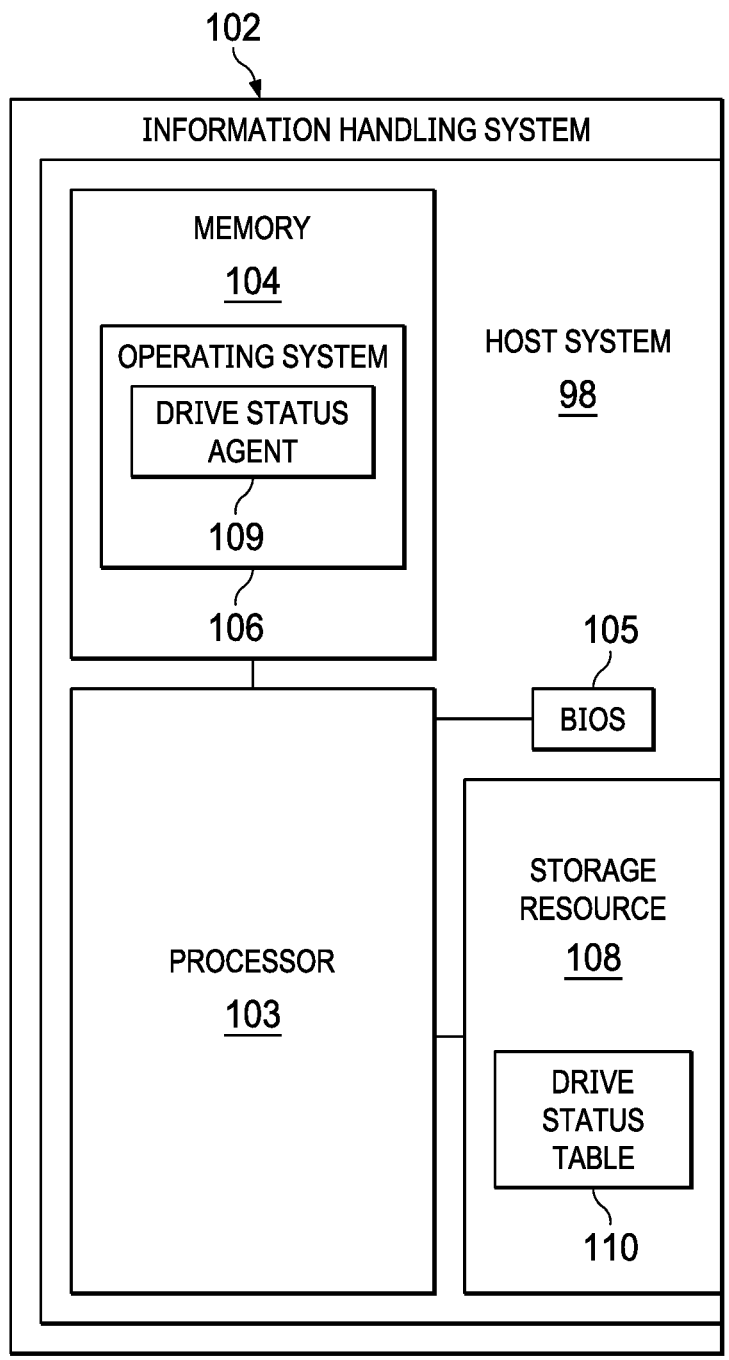
FIG. 1 illustrates a block diagram of an example information handling system, in accordance with embodiments of the present disclosure.
Figure 2:
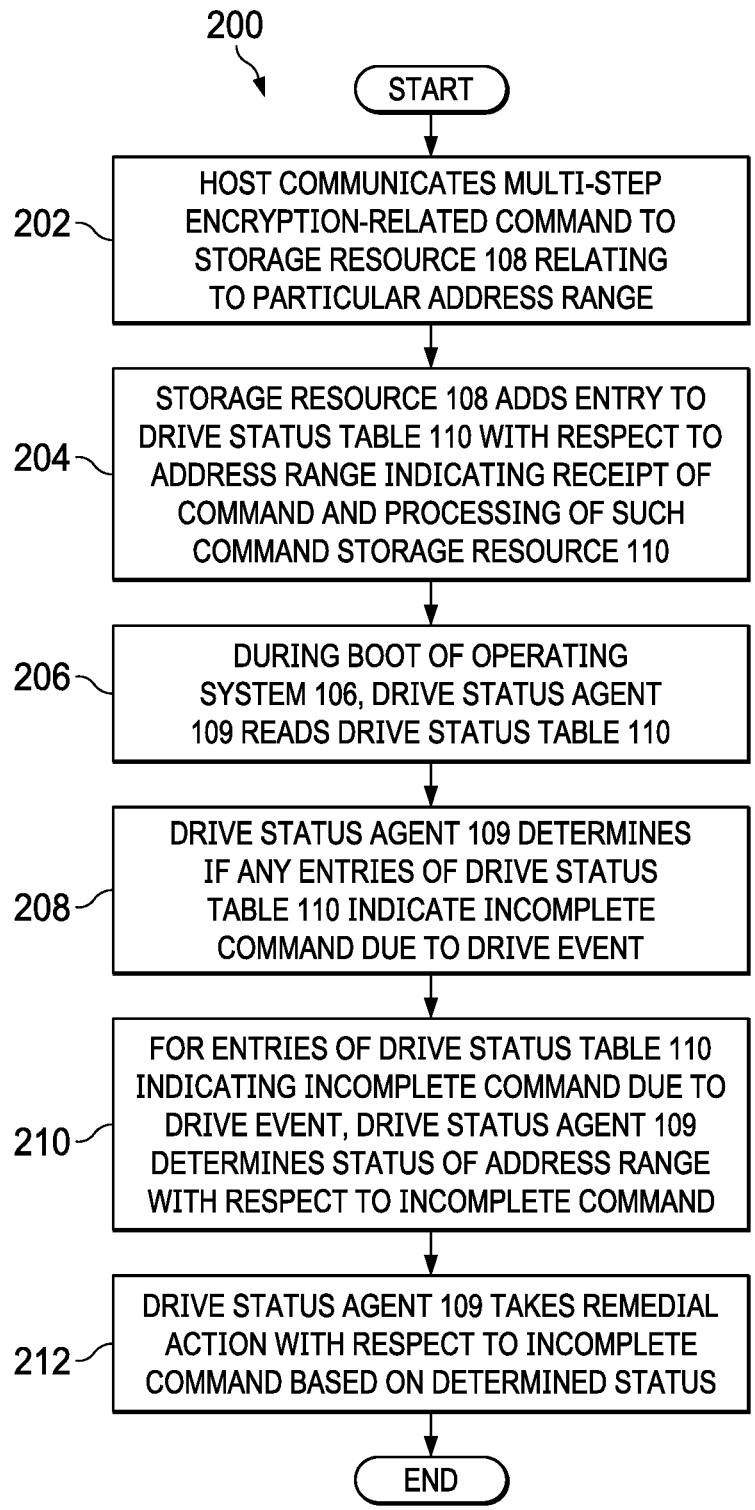
FIG. 2 illustrates a flow chart of an example method for safely detecting indeterminate states of ranges in a storage resource, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server or storage subsystem. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, and a storage resource 108 communicatively coupled to processor 103. In operation, processor 103, memory 104, BIOS 105, and storage resource 108 may comprise at least a portion of a host system 98 of information handling system 102. For purposes of clarity and exposition, information handling system 102 has been depicted to comprise only a single host system 98. In some embodiments, information handling system 102 may comprise a plurality of host systems 98.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. Active portions of operating system 106 may be transferred to memory 104 for execution by processor 103. Although operating system 106 is shown in FIG. 1 as stored in memory 104, in some embodiments operating system 106 may be stored in storage media accessible to processor 103 (e.g., storage resource 108 and/or other storage media), and active portions of operating system 106 may be transferred from such storage media to memory 104 for execution by processor 103.

As shown in FIG. 1, operating system 106 may include a drive status agent 109. Drive status agent 109 may comprise one or more programs of instructions which may be read and executed by processor 103 and may be configured to, when executed by processor 103, access a drive status table 110 of storage resource 108, analyze information set forth in drive status table 110, and, if needed, take remedial action as described in greater detail below.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Storage resource 108 may be communicatively coupled to processor 103 and may include any system, device, or apparatus operable to store information processed by processor 103. In some embodiments, storage resource 108 may comprise a self-encrypting drive. Storage resource 108 may include, for example, network attached storage, one or more direct access storage devices (e.g., hard disk drives), one or more optical media drives (e.g., CD-ROM, DVD drives, Blu-Ray disk drive, etc.), and/or one or more sequential access storage devices (e.g., tape drives). As shown in FIG. 1, storage resource 108 may have stored thereon drive status table 110.

Drive status table 110 may comprise a table, map, list, log, or other suitable data structure that sets forth status information relating to commands issued by processor 103 to storage resource 110. Drive status table 110 may be stored to a persistent storage area of storage resource 108. For example, in response to receipt of a multi-step command from processor 103 relating to a particular address range of storage resource 108, storage resource 110 may insert an entry into drive status table 110 relating to the address range and update the table for each address range as steps within a multi-step command complete. Additional information storage resource 110 may store a time stamp and relevant parameters, including key identifiers, for the address range and/or multi-step command. For example, for an entry indexed by a particular range, the entry may include an indication of the last step of a multi-step command that has been executed, a time stamp associated with such execution, a completion status of the step (e.g., active, completed, failed), and a key identifier associated with the command.

In some embodiments, drive status agent 109 may be able to query drive status table 110 independently and out of band of an encrypted input/output session between storage resource 110 and processor 103. In these and other embodiment, drive status table 110 may comprise a log page that is read using normal READ LOG/LOG SENSE commands and not through encryption-oriented session (e.g., TCG) protocols.

Using such information, in the event of a drive event that prevents completion of a multi-step command, drive status agent 109 may query drive status table 110 to determine the status of a multi-step command, and may take remedial action if drive status table 110 indicates that an address range lacks integrity due to a multi-step command failing to complete due to a drive event. Such remedial actions may include, without limitation, disallowing input/output operations on the address range, replaying the failed command, or labeling the address range or storage resource 110 as having an indeterminate state.

In addition to processor 103, memory 104, and storage resource 108, information handling system 102 may include one or more other information handling resources.

FIG. 2 illustrates a flow chart of an example method 200 for safely detecting indeterminate states of ranges in a storage resource 108, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a host may communicate a multi-step encryption-related command (e.g., create range, rekey, etc.) to storage resource 108 relating to a particular address (e.g., LBA) range. At step 204, in response, storage resource 108 may add an entry to the persistently-maintained drive status table 110 with respect to the range, to indicate that the command has been received and processing of such command by storage resource 110 is in progress. Accordingly, drive status table 110 may maintain separate entries for each address range that may be operated on by host system 98 in order to lookup the integrity of each address range. As the command is processed, storage resource 108 may periodically update drive status table 110 to indicate the most recent step of a multi-step command that has been processed.

At step 206, during a boot of operating system 106, drive status agent 109 may read drive status table 110 to determine the status of storage resource 108 and the various address ranges. A host system may be capable of querying drive status table 110 independently and out of band of the trusted session between host system 98 and storage resource 108. At step 208, drive status agent 109 may determine if any entries of drive status table 110 indicate an incomplete command due to a drive event (e.g., power loss, system reset, etc.). At step 210, for entries of drive status table 110 that indicate an incomplete command due to a drive event, drive status agent 109 may determine a status of the address range with respect to an incomplete command. At step 212, drive status agent 109 may take a remedial action with respect to an incomplete command based on the determined status (e.g., input/output operations on the address range, replaying the failed command, or labeling the address range or storage resource 110 as having an indeterminate state).

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using bootable update image file 110, operating system 106, and/or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a host system processor; and
a storage resource comprising a self-encrypting drive and communicatively coupled to the host system processor and configured to:
responsive to receiving a command from the host system processor which is a multi-step command for performing an encryption-related task on the storage resource and relating an address range of the storage resource, create an entry in a drive status table stored in a persistent storage area of the storage resource, the entry setting forth information indicative of the address and a completion status of the command; and
update a status of the address range in the drive status table as steps of the command are completed by the storage resource;
such that, if a drive event occurs preventing full completion of the command, the host system processor may access the drive status table to determine a status of the command, and take a remedial action based on the status of the command.

2. An information handling system comprising:
a host system processor; and
a storage resource communicatively coupled to the host system processor and configured to:
responsive to receiving a command from the host system processor relating an address range of the storage resource, create an entry in a drive status table stored in a persistent storage area of the storage resource, the entry setting forth information indicative of the address, a completion status of the command, and a key identifier associated with the command; and update a status of the address range in the drive status table as steps of the command are completed by the storage resource;

such that, if a drive event occurs preventing full completion of the command, the host system processor may access the drive status table to determine a status of the command, and take a remedial action based on the status of the command.

3. An information handling system comprising:

a host system processor; and a storage resource communicatively coupled to the host system processor and configured to:

responsive to receiving a command from the host system processor relating an address range of the storage resource, create an entry in a drive status table stored in a persistent storage area of the storage resource, the entry setting forth information indicative of the address and a completion status of the command; and update a status of the address range in the drive status table as steps of the command are completed by the storage resource;

such that, if a drive event occurs preventing full completion of the command, the host system processor may access the drive status table to determine a status of the command, and take a remedial action based on the status of the command, wherein the remedial action comprises one of disallowing input/output operations with respect to the address, replaying the command, labeling the address as having an indeterminate state, and labeling the storage resource as having an indeterminate state.

4. A method comprising, on a storage resource having a self-encrypting drive and communicatively coupled to a host system processor of an information handling system, responsive to receiving a multi-step command for performing an encryption-related task on the storage resource from the host system processor relating an address range of the storage resource:

creating an entry in a drive status table stored in a persistent storage area of the storage resource, the entry setting forth information indicative of the address and a completion status of the command; and updating a status of the address range in the drive status table as steps of the command are completed by the storage resource;

such that, if a drive event occurs preventing full completion of the command, the host system processor may access the drive status table to determine a status of the command, and take a remedial action based on the status of the command.

5. A method comprising, on a storage resource communicatively coupled to a host system processor of an information handling system and responsive to receiving a command from the host system processor relating an address range of the storage resource:

creating an entry in a drive status table stored in a persistent storage area of the storage resource, the entry setting forth information indicative of the address, a completion status of the command, and a key identifier associated with the command; and updating a status of the address range in the drive status table as steps of the command are completed by the storage resource;

such that, if a drive event occurs preventing full completion of the command, the host system processor may access the drive status table to determine a status of the command, and take a remedial action based on the status of the command.

6. A method comprising, on a storage resource communicatively coupled to a host system processor of an information handling system and responsive to receiving a command from the host system processor relating an address range of the storage resource:

creating an entry in a drive status table stored in a persistent storage area of the storage resource, the entry setting forth information indicative of the address and a completion status of the command; and updating a status of the address range in the drive status table as steps of the command are completed by the storage resource;

such that, if a drive event occurs preventing full completion of the command, the host system processor may access the drive status table to determine a status of the command, and take a remedial action based on the status of the command, wherein the remedial action comprises one of disallowing input/output operations with respect to the address, replaying the command, labeling the address as having an indeterminate state, and labeling the storage resource as having an indeterminate state.

7. An article of manufacture comprising:

a non-transitory computer-readable medium; and computer-executable instructions carried on the computer-readable medium, the instructions readable by a processor, the instructions, when read and executed, for causing the processor to, on a storage resource comprises a self-encrypting drive and communicatively coupled to a host system processor of an information handling system:

responsive to receiving a multi-step command for performing an encryption-related task on the storage resource from the host system processor relating an address range of the storage resource, create an entry in a drive status table stored in a persistent storage area of the storage resource, the entry setting forth information indicative of the address and a completion status of the command; and update a status of the address range in the drive status table as steps of the command are completed by the storage resource;

such that, if a drive event occurs preventing full completion of the command, the host system processor may access the drive status table to determine a status of the command, and take a remedial action based on the status of the command.

8. An article of manufacture comprising:

a non-transitory computer-readable medium; and computer-executable instructions carried on the computer-readable medium, the instructions readable by a processor, the instructions, when read and executed, for causing the processor to, on a storage resource communicatively coupled to a host system processor of an information handling system:

responsive to receiving a command from the host system processor relating an address range of the storage resource, create an entry in a drive status table stored in a persistent storage area of the storage resource, the entry setting forth information indicative of the address, a completion status of the command, and a key identifier associated with the command; and update a status of the address range in the drive status table as steps of the command are completed by the storage resource;

such that, if a drive event occurs preventing full completion of the command, the host system processor may access the drive status table to determine a status of the command, and take a remedial action based on the status of the command.

9. An article of manufacture comprising:

a non-transitory computer-readable medium; and computer-executable instructions carried on the computer-readable medium, the instructions readable by a processor, the instructions, when read and executed, for causing the processor to, on a storage resource communicatively coupled to a host system processor of an information handling system:

responsive to receiving a command from the host system processor relating an address range of the storage resource, create an entry in a drive status table stored in a persistent storage area of the storage resource, the entry setting forth information indicative of the address and a completion status of the command; and update a status of the address range in the drive status table as steps of the command are completed by the storage resource;

such that, if a drive event occurs preventing full completion of the command, the host system processor may access the drive status table to determine a status of the command, and take a remedial action based on the status of the command, wherein the remedial action comprises one of disallowing input/output operations with respect to the address, replaying the command, labeling the address as having an indeterminate state, and labeling the storage resource as having an indeterminate state.

* * * * *